(12) United States Patent
Mishra et al.

(10) Patent No.: US 9,157,518 B2
(45) Date of Patent: Oct. 13, 2015

(54) SEAL HAVING INTEGRAL INSERT

(71) Applicant: Electro-Motive Diesel, Inc., Lagrange, IL (US)

(72) Inventors: Saket Mishra, Burr Ridge, IL (US); Thomas Sholeen, Western Springs, IL (US); Kevin Brinker, Orland Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 91 days.

(21) Appl. No.: 13/707,353

(22) Filed: Dec. 6, 2012

(65) Prior Publication Data
US 2014/0157953 A1 Jun. 12, 2014

(51) Int. Cl.
*F16J 9/00* (2006.01)
*F16H 57/029* (2012.01)
*B61C 9/50* (2006.01)

(52) U.S. Cl.
CPC .............. *F16H 57/029* (2013.01); *B61C 9/50* (2013.01); *Y10T 74/2186* (2015.01)

(58) Field of Classification Search
CPC ..... F16J 15/104; F16J 15/0887; F16J 15/061; F16J 9/00
USPC .......... 277/620, 626, 628, 630, 637, 651, 345
See application file for complete search history.

(56) References Cited

U.S. PATENT DOCUMENTS

| | | | | |
|---|---|---|---|---|
| 2,687,909 | A | * | 8/1954 | Blackman et al. ............ 277/651 |
| 2,722,043 | A | * | 11/1955 | Nenzell ........................ 49/479.1 |
| 3,710,646 | A | | 1/1973 | Bogan |
| 3,727,483 | A | | 4/1973 | Hanson et al. |
| 4,389,050 | A | | 6/1983 | Johnson et al. |
| 4,470,324 | A | * | 9/1984 | Renk et al. ................... 74/606 R |
| 4,535,996 | A | * | 8/1985 | Cardis et al. .................. 277/313 |
| 4,650,194 | A | | 3/1987 | Sosson |
| 4,730,833 | A | | 3/1988 | Foster et al. |
| 5,676,221 | A | * | 10/1997 | Renk et al. ................... 184/6.12 |
| 6,039,323 | A | * | 3/2000 | Mockenhaupt et al. ...... 277/593 |
| 6,193,240 | B1 | | 2/2001 | Johnson et al. |
| 6,315,296 | B1 | * | 11/2001 | Oldenburg .................... 277/353 |
| 7,159,874 | B2 | * | 1/2007 | Hosokawa .................... 277/651 |

FOREIGN PATENT DOCUMENTS

WO     WO 84/00997     3/1984

* cited by examiner

*Primary Examiner* — Kristina Fulton
*Assistant Examiner* — Nathan Cumar
(74) *Attorney, Agent, or Firm* — Finnegan, Henderson, Farabow, Garrett & Dunner, LLP

(57) ABSTRACT

In one aspect, the disclosure is related to a seal for a gear case. The seal may comprise a body, and at least one insert substantially enclosed within the body. The insert may include a first side, a second side opposite the first side, and a passage extending from the first side to the second side. A portion of the body may pass through the passage from the first side to the second side.

12 Claims, 4 Drawing Sheets

SEAL HAVING INTEGRAL INSERT

TECHNICAL FIELD

The present disclosure is directed to a seal and, more particularly, to a seal having an integral insert.

BACKGROUND

Locomotives traditionally include a traction motor that drives one or more wheel sets and propels the locomotive. The traction motor may receive power in the form of electricity from a generator powered by one or more main engines of the locomotive. The traction motor that drives the wheel sets may include a motor shaft connected to the wheel sets. The motor shaft may be connected to a pinion gear inside a two-piece matable gear case, and the main shaft may extend through an opening in a wall of the gear case. The pinion gear may drive a bull gear also contained within the gear case. The bull gear may be connected to a wheel shaft that may extend through an additional opening in the gear case wall. The gear case may be mounted to the motor via a flange, and the gear case may include seals located around the motor shaft and wheel shaft. The seals may be configured to substantially eliminate leakage of a lubricant through the openings in the walls of the gear case during use.

During operation, the locomotive may experience vibratory loading while traversing an uneven support surface. For example, in cold weather, the ground may freeze unevenly causing the tracks on which the locomotive rides to shift. Such shifting may cause non-uniform rotation of wheels and may cause components connected to the wheels to vibrate. For example, the wheels may transfer such vibration to the bull gear and pinion gear via the wheel shaft. The vibration may then pass from the gears, through the motor shaft, and into the traction motor. As the vibration causes the rigidly mounted components to move, distances between the rigidly mounted components may increase or decrease. In some embodiments, the seals located between the components may expand and contract. However, since such seals are typically made of a flexible material, the seals are usually not configured to limit the range of motion of such rigidly mounted components relative to each other. Instead, the relative movement between the various rigidly mounted components may cause tensile or compressive stresses to build over time, and eventually, such stresses may cause system failure.

One method of sealing a locomotive gear case is described in U.S. Pat. No. 4,347,759 ("the '759 patent") to Renk. The '759 patent describes a lubricant-retaining device for use with a gear case having a pair of matable sections with a shaft-receiving opening therein. The lubricant-retaining device extends inwardly to the interior of the gear case to reduce lubricant flow through the opening.

While the system disclosed in the '759 patent may assist in retaining a lubricant within the gear case in some applications, the system is not designed to limit the freedom of motion of its components during vibratory loading. As a result, the components of the system may suffer premature failure due to stresses caused by vibration.

The exemplary embodiments of the present disclosure are directed at solving one or more of the problems set forth above and/or other problems in the art.

SUMMARY

In one aspect, the disclosure is related to a seal for a gear case. The seal may comprise a body, and at least one insert substantially enclosed within the body. The insert may include a first side, a second side opposite the first side, and a passage extending from the first side to the second side. A portion of the body may pass through the passage from the first side to the second side.

In another aspect, the disclosure is related to a method of forming a substantially fluid-tight seal between multiple components. The method may comprise coupling an outer surface of a seal to a first stationary component wherein a first cutout of the seal accepts a corresponding structure of the first stationary component. Additionally, the method may comprise coupling a first portion of an inner surface of the seal to a second stationary component wherein a second cutout of the seal accepts a corresponding structure on the second stationary component. The seal and the first stationary component may form a compartment containing a fluid lubricant. The method may further comprise restraining relative movement between the first and second stationary components in a radial direction with at least one insert substantially enclosed within a body of the seal.

In another aspect, the disclosure is related to a gear case assembly. The gear case may include a first wall having a first side, a second side opposite the first side, and an opening extending from the first side to the second side. A traction motor may be rigidly coupled to the gear case proximate the first side and a stationary component may be rigidly coupled to the traction motor and disposed substantially within the opening in the gear case. A seal may engage the opening of the gear case and form a substantially fluid-tight seal between the gear case and the stationary component. The seal may comprise a body and an insert enclosed substantially within the body and may be configured to assist in retaining relative movement in a radial direction between the gear case and the stationary component

DETAILED DESCRIPTION

Figure 1:
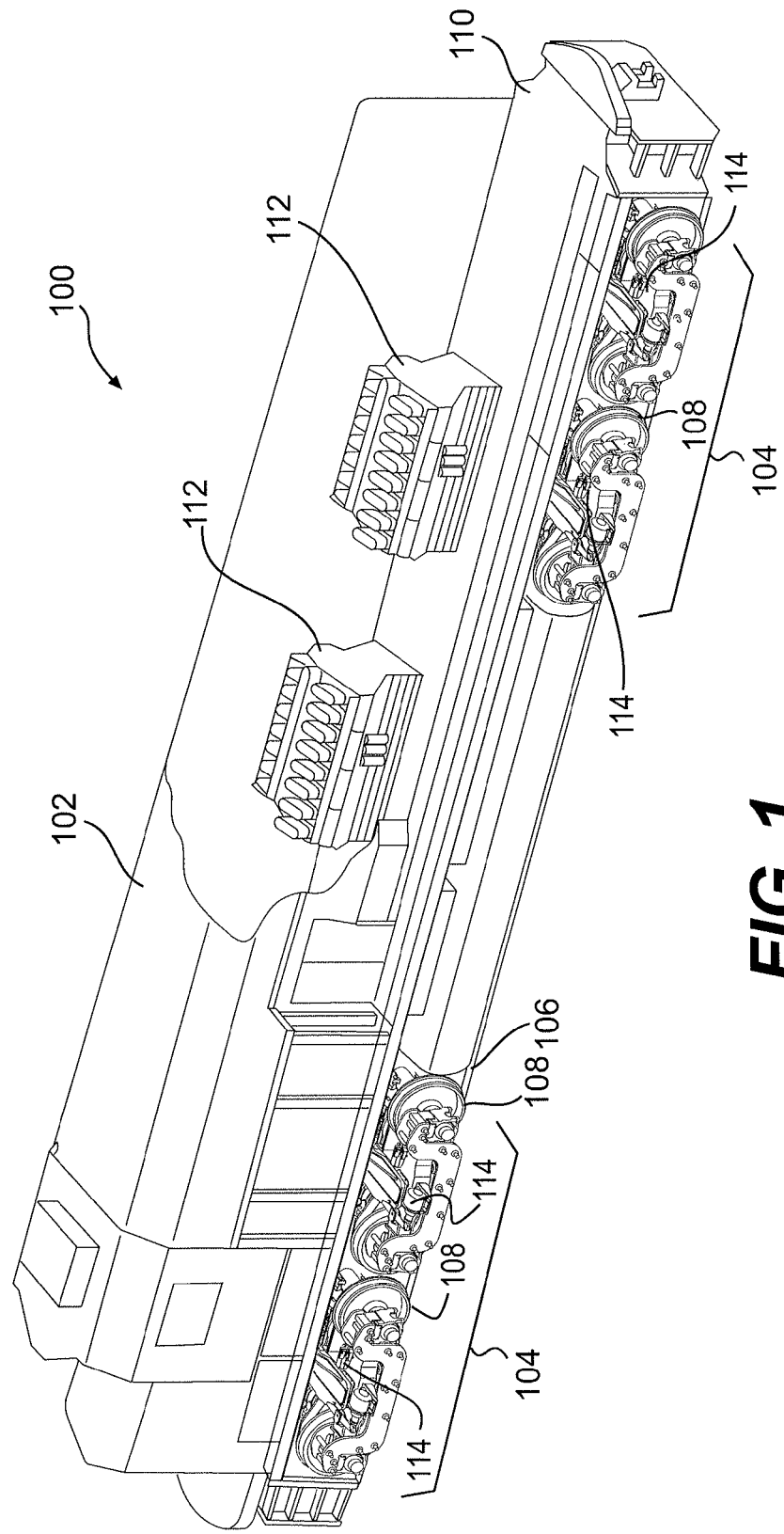
FIG. 1 is a pictorial illustration of an exemplary locomotive.

FIG. 1 illustrates an exemplary embodiment of a locomotive 100. In some embodiments, locomotive 100 may tow a tender car (not shown), a passenger car (not shown), a cargo container car (not shown), or another type of car. Locomotive 100 may include a car body 102 supported at opposing ends by a plurality of trucks 104 (e.g., two trucks 104). Each truck 104 may be configured to engage a track 106 via a plurality of wheels 108, and to support a frame 110 of car body 102. Any number of main engines 112 may be mounted to frame 110 and configured to drive wheels 108 included within each truck 104. Each set of wheels 108 may have a respective traction motor 114 mounted to a wheel shaft 214 (FIG. 2) via a pair of roller bearings (not shown). Additionally, traction motor 114 may be attached to a bogie frame (not shown) via a link (not shown). In exemplary embodiments, main engine 112 may drive a generator (not shown) to produce electricity that may power traction motor 114. Traction motor 114 may receive electrical power from the generator via cables (not shown) or other similar power connection devices. Traction motor 114 may use electrical power received from the generator to drive wheels 108 and propel locomotive 100.

Figure 2:
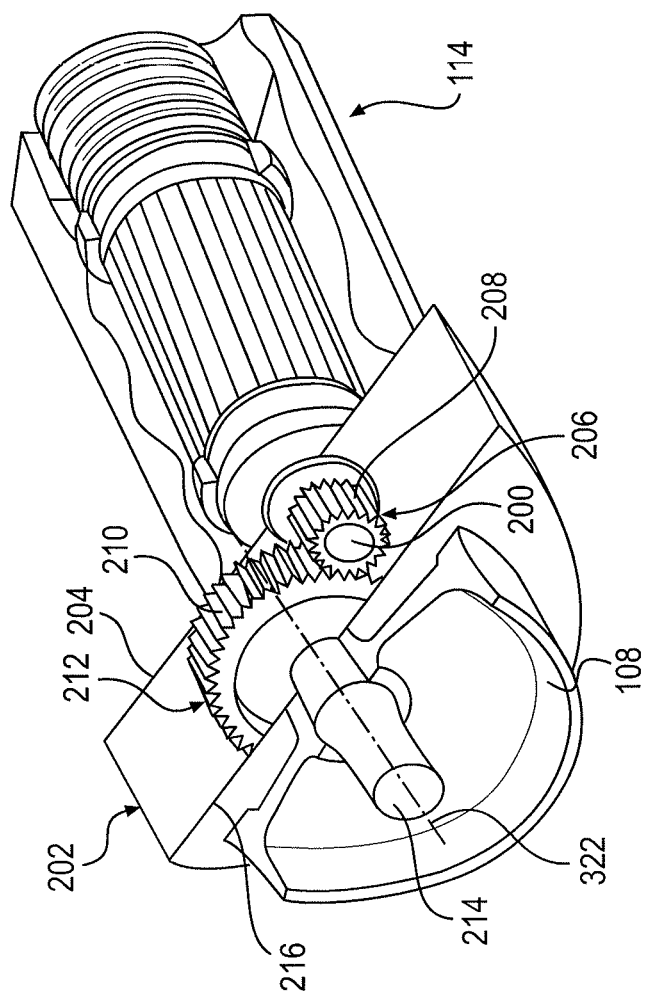
FIG. 2 is a pictorial illustration of an exemplary traction motor of the locomotive shown in FIG. 1.

FIG. 2 illustrates an exemplary traction motor 114 configured to drive a motor shaft 200 associated with traction motor 114. Motor shaft 200 may exit traction motor 114 via an opening in traction motor 114 and may enter a gear case 202 associated with traction motor 114 via a first opening (not shown) in gear case 202. For example, motor shaft 200 may pass through a first wall 204 of gear case 202 via the first opening. Inside gear case 202, a pinion gear 206 may be rigidly coupled and/or otherwise mounted to motor shaft 200 via an interference fit, press fit, shrink fit, a pair of nuts (not shown), and/or other known mounting methods. An exemplary interference fit, or press fit, may be accomplished when an inner diameter of pinion gear 206 is smaller than an outer diameter of motor shaft 200. An exemplary shrink fit may be achieved by heating or cooling pinion gear 206 or motor shaft 200 such that pinion gear 206 slides onto motor shaft 200 and, once pinion gear 206 and motor shaft 200 reach the same temperature, the two components are rigidly coupled. In exemplary embodiments, due to the rigid coupling between pinion gear 206 and motor shaft 200, rotation of motor shaft 200 may cause pinion gear 206 to rotate in conjunction with and/or at the same rate as motor shaft 200. In such exemplary embodiments, pinion gear 206 and motor shaft 200 may be said to "corotate."

Pinion gear 206 may contain a series of gear teeth 208 that may mesh with a corresponding series of gear teeth 210 on a bull gear 212 disposed within gear case 202. In exemplary embodiments, pinion gear 206 may drive bull gear 212 via the respective meshed gear teeth 208, 210. Inside gear case 202, bull gear 212 may be mounted to a wheel shaft 214 via an interference fit, press fit, shrink fit, a pair of nuts (not shown), and/or other known mounting methods. An exemplary interference fit may be accomplished when an inner diameter of bull gear 212 is smaller than an outer diameter of wheel shaft 214. In exemplary embodiments, bull gear 212 may corotate with wheel shaft 214 due to the rigid coupling between bull gear 212 and wheel shaft 214. Wheel shaft 214 may exit gear case 202 through a second opening 300 (FIG. 3) in a second wall 216 of gear case 202. Outside of gear case 202, wheel 108 may be rigidly mounted to wheel shaft 214 in any number of ways, for example, an interference fit, press fit, shrink fit, a pair nuts (not shown), and/or other known mounting methods.

Figure 3:
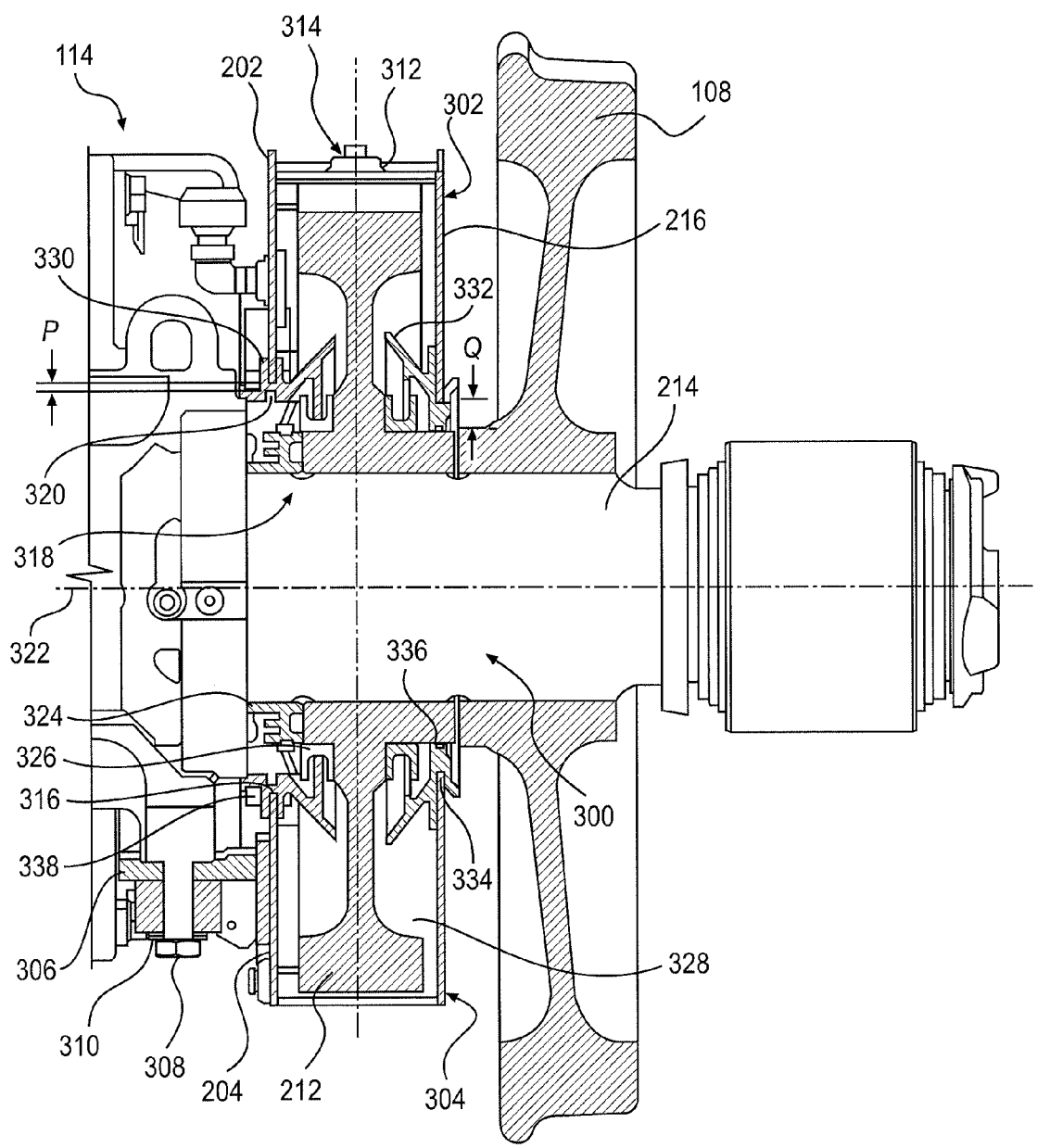
FIG. 3 is a cross-sectional view an exemplary gear case associated with the traction motor of FIG. 2.

FIG. 3 illustrates an exemplary cross-sectional view, along a center axis 322 of wheel shaft 214 and bull gear 212, of the exemplary gear case 202 shown in FIG. 2. In one embodiment, gear case 202 may be a two-piece assembly consisting of an upper half 302 and a lower half 304. Upper half 302 and lower half 304 may be connected in any number of ways to form gear case 202. For example, upper half 302 may contain a first mating surface (not shown) that may mate with a corresponding second mating surface (not shown) on lower half 304. The first mating surface and the second mating surface may be rigidly coupled in any known way. For example, the first and second mating surfaces may be adhered, pinned, and/or bolted together. In exemplary embodiments, upper half 302 may contain a first mating flange (not shown) which may correspond with a second mating flange (not shown) on lower half 304. The first mating flange and the second mating flange may each contain a series of holes, such as thru-holes or tapped holes. A series of screws, nuts, and/or bolts may be inserted into such corresponding holes, and may clamp upper half 302 and lower half 304 together. In other embodiments, the first mating flange and the second mating flange may be rigidly coupled via adhesion, a series of clamps, pins, and/or other like components. In some embodiments, a gasket (not shown), and/or other like sealing components, may be placed between the first mating surface of upper half 302 and the second mating surface of lower half 304. Such a gasket may assist in retaining a lubricant (not shown) inside gear case 202 when upper half 302 and lower half 304 are rigidly coupled.

In some embodiments, upper and lower halves 302, 304 may form a substantially fluid-tight compartment 328 for retaining such lubricant. In further embodiments, upper and lower halves 302, 304, along with one or more of the components discussed herein, may assist in forming the substantially fluid-tight compartment 328 for retaining the lubricant and/or other fluids.

In some embodiments, gear case 202 may be mounted to traction motor 114 via a flange 306 and secured with a bolt 308 and a washer 310. Bolt 308 may provide a retention force, while washer 310 may distribute the retention force applied by bolt 308 along an even mounting surface of flange 306. In further embodiments, gear case 202 may be mounted to traction motor 114 using a series of clamps, and/or any other known methods.

In some embodiments, a lubricant may be disposed within compartment 328 of gear case 202. The lubricant may be a liquid, for example, an oil. In some embodiments, the lubricant may be a petroleum-based oil and may contain additives. The lubricant may have several properties, for example, a high boiling point, a low freezing point, a high viscosity index, and/or other lubricating qualities. In some embodiments, the lubricant may form a thin lubricating layer between moving components, for example, between gear teeth 208 (FIG. 2) of pinion gear 206 (FIG. 2) and gear teeth 210 (FIG. 2) of bull gear 212. Such a lubricating layer may reduce friction between the moving components, such as gear teeth 208, 210. In still further embodiments, the lubricant may provide cooling capabilities by absorbing heat generated by friction between the moving components, for example, gear teeth 208, 210.

In some embodiments, the lubricant may be supplied to gear case 202 via a lubricant manifold (not shown). The lubricant may be delivered to the lubricant manifold from a lubricant reservoir (not shown) via a series of tubes (not shown). The lubricant reservoir may be rigidly mounted to first wall 204 of gear case 202. For example, the lubricant reservoir may be clamped to first wall 204 of gear case 202, and in some embodiments, first wall 204 may contain a first flange that may mate with a second flange on the lubricant reservoir via a series of bolts, screws, and/or other known connection methods. In some embodiments, the lubricant reservoir may be rigidly mounted to traction motor 114. In further embodiments, the lubricant may be placed in gear case 202 as gear case 202 is being assembled. Alternatively, the lubricant may be inserted into gear case 202 via an opening 312 with a cover 314 after gear case 202 is assembled. For example, a filling spout may be used.

In some embodiments, a support bearing end cap 316 may be located within a third opening 318 of gear case 202. In some embodiments, cap 316 may be positioned a distance P from gear case 202, wherein distance P may define an assembly and/or operational distance between cap 316 and gear case 202. In some embodiments, cap 316 may be rigidly mounted to traction motor 114 and may not rotate. For example, cap 316 may contain a feature that may mate with a corresponding feature on traction motor 114 such that cap 316 and traction motor 114 are rigidly coupled. Cap 316 may be configured to provide a grease cavity for a support bearing (not shown) of traction motor 114. For example, cap 316 may include a void within its structure that may contain a grease, such as a lithium-based grease, sodium-based grease, and/or other known greases, which may lubricate the support bearing. In additional embodiments, cap 316 may also locate the support bearing in a support bearing housing (not shown). For example, cap 316 may include a feature that may mate with a corresponding feature on the support bearing and the support bearing housing such that the support bearing remains seated in the support bearing housing. In some embodiments, cap 316 may be configured with a tab 320. Tab 320 may be substantially rectangular and may be substantially perpendicular to axis 322 of wheel shaft 214. In further embodiments, tab 320 may be any one of multiple shapes including substantially triangular, substantially square, substantially oval, substantially oblong and/or other known shapes.

In some embodiments, a labyrinth seal 324 may be located proximate bull gear 212 and, additionally, may be rigidly coupled to wheel shaft 214. For example, the rigid coupling between labyrinth seal 324 and wheel shaft 214 may be achieved by an interference fit, threaded connection, and/or other known coupling methods. Labyrinth seal 324 may corotate with wheel shaft 214 via the rigid coupling. Labyrinth seal 324 may be configured to separate the grease of the support bearing from the lubricant of the gear case 202.

In some embodiments, a gutter seal 326 may be rigidly coupled to bull gear 212. For example, gutter seal 326 and bull gear 212 may be rigidly coupled via a threaded connection, an interference fit, an adhesive, and/or other known coupling methods. In some embodiments, gutter seal 326 may be configured to divert the lubricant away from the labyrinth seal 324. For example, gutter seal 326 may include a U-shaped cavity that may siphon the lubricant into a bottom of compartment 328 of gear case 202. In some embodiments, the U-shaped cavity may extend substantially perpendicular to axis 322.

In exemplary embodiments, a seal 332 may be disposed substantially between bull gear 212 and gear case halves 304, 302. For example, seal 332 may be disposed between second opening 300 of second wall 216 and bull gear 212, which may be rigidly mounted to wheel shaft 214. In some embodiments, seal 332 may be disposed substantially within a distance Q, wherein distance Q may define an assembly and/or operational distance between gear case 202 and bull gear 212. In further embodiments, an inner surface 336 of seal 332 may compress against bull gear 212 thereby forming a fluid-tight seal. In additional embodiments, a sealant may be disposed between seal 332 and gear case 202. For example, the sealant may adhere the walls of a groove 334 to second wall 216 of gear case 202. In some embodiments, the sealant may be substantially liquid and, over a period of time, may harden to adhere seal 332 to second wall 216 of gear case 202.

Figures 4, 5:
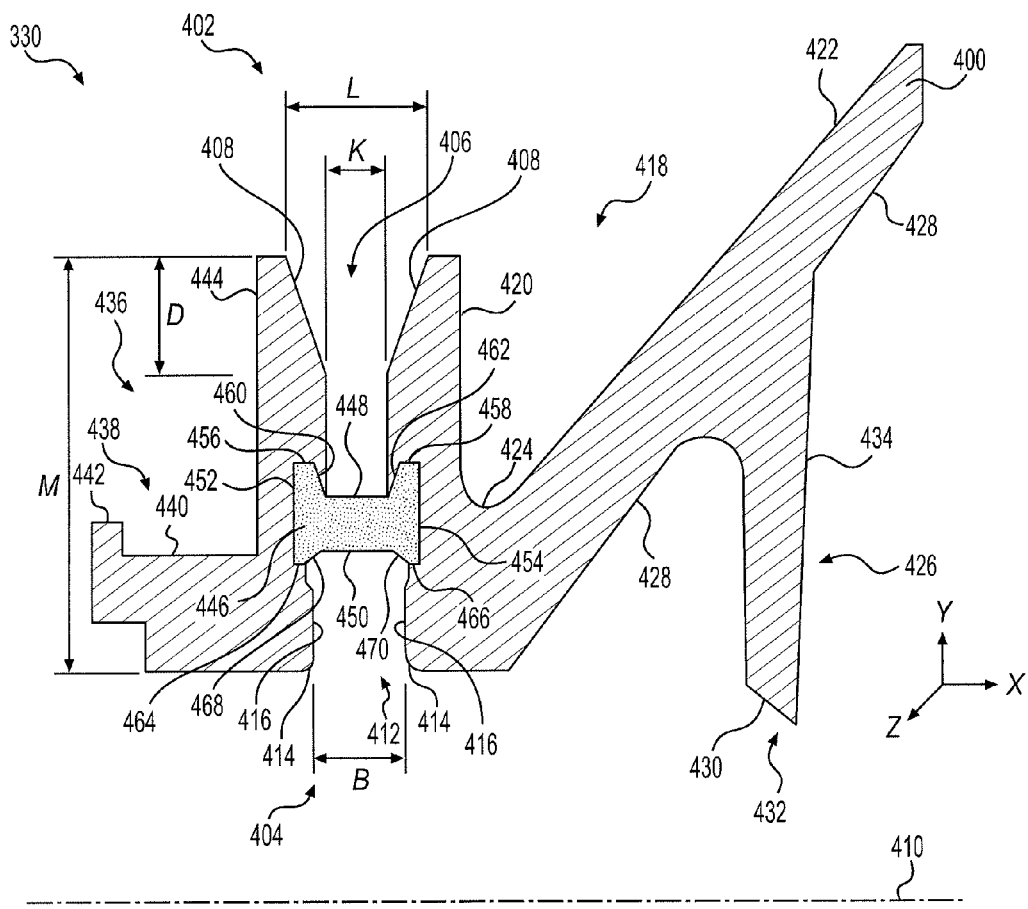
FIG. 4 is a cross-sectional view of an exemplary seal associated with the gear case of FIG. 3.
FIG. 5 is a circumferential view, or z-axis view, of a portion of the exemplary seal of FIG. 4.

In further embodiments, a second seal 330 may be disposed opposite first seal 332 and may be disposed substantially within third opening 318 of gear case 202. In further embodiments, seal 330 may also be disposed between gear case 202 on an outer surface 402 (FIG. 4) and partially disposed between cap 316 and gutter seal 326 on an inner surface 404 (FIG. 4). In some embodiments, a clamp 338 may be affixed to seal 330. Clamp 338 may assist in forming a substantially fluid-tight seal between seal 330 and cap 316 such that seal 330 may retain the lubricant inside gear case 202.

FIG. 4 is an exemplary cross-sectional view of seal 330. Seal 330 may be substantially identical to seal 332 and may comprise a substantially annular and/or flexible body 400. Body 400 may comprise a polymer, rubber, plastic, and/or any other like flexible materials. Outer and inner surfaces 402, 404 of seal 330 may be substantially planar and/or any other shape. For example, outer surface 402 may contain a first substantially rectangular cutout 406 which may extend radially from outer surface 402 towards inner surface 404. First cutout 406 may have a depth of approximately half a distance M between outer surface 402 and inner surface 404. In some embodiments, first cutout 406 may be configured to mate with third opening 318 (FIG. 3) of gear case 202. For example, a width K of first cutout 406 may be greater than a width of first wall 204 (FIG. 3) of gear case 202. In further embodiments, width K may be less than the width of first wall 204 of gear case 202. In further embodiments, a sealant may adhere first cutout 406 of body 400 to first wall 204 of gear case 202. In some embodiments, the sealant may be substantially liquid and may harden over a given period of time, to aid in lubricant retention.

In some embodiments, outer surface 402 of seal 330 may include a pair of chamfers 408. Chamfers 408 may extend radially inward from outer surface 402 of seal 330, towards inner surface 404, at an angle to a center axis 410 of seal 330 (axis 410 not drawn to scale in FIG. 4). In some embodiments, first cutout 406 may be disposed between chamfers 408. In further embodiments, chamfers 408 may cause first cutout 406 to be Y-shaped. For example, chamfers 408 may be separated at width K at a depth D of first cutout 406 and may be separated at outer surface 402 by a second width L. In some embodiments, width L may be greater than width of first wall 204 of gear case 202.

In some embodiments, inner surface 404 of seal 330 may contain a second rectangular cutout 412, which may be disposed opposite first cutout 406. Second cutout 412 may extend substantially inward from inner surface 404 of seal 330 approximately one quarter of distance M and may be substantially perpendicular to axis 410. In some embodiments, an intersection 414 between side walls 416 of second cutout 412 and inner surface 404 of seal 330 may be substantially rounded. In some embodiments, second cutout 412 may be configured to mate with wheel shaft 214 (FIG. 2). In further embodiments, second cutout 412 may be configured to mate with bull gear 212 (FIG. 2). In still further embodiments, second cutout 412 may be configured to mate with labyrinth seal 324 which may be rigidly mounted to bull gear 212. For example, width B of second cutout 412 may be greater than the width of tab 320 of labyrinth seal 324.

In some embodiments, outer surface 402 of seal 330 may contain a J-shaped cutout 418. For example, a first wall 420 of cutout 418 may be substantially perpendicular to axis 410. A second wall 422 of cutout 418 may extend radially outward from axis 410 at an acute angle relative to first wall 420 and may intersect with first wall 420 at an intersection 424. In some embodiments, intersection 424 between first wall 420 and second wall 422 may be substantially rounded. In other embodiments, intersection 424 between first wall 420 and second wall 422 may be pointed and/or other known shapes.

In further embodiments, seal 330 may contain a knife-edge feature 426. For example, knife-edge feature 426 may extend substantially radially inward from a surface 428 towards axis 410 of seal 330. In some embodiments, knife-edge feature 426 may be substantially perpendicular to axis 410 of seal 330. In some embodiments, knife-edge feature 426 may comprise a substantially rectangular extension of seal 330, and may contain a chamfer 430 on an inner surface 432 of knife-edge feature 426. Chamfer 430 may extend at an acute angle relative to wall 434 of knife-edge feature 426. In such embodiments, inner surface 432 may form a substantially pointed intersection with wall 434. Knife-edge feature 426 may be configured to mate with gutter seal 326 (FIG. 3) and retain the lubricant inside gear case 202 (FIG. 3). For example, inner surface 432 of knife-edge feature 426 may be configured such that inner surface 432 is located substantially within the U-shaped groove of gutter seal 326 and may compress against an outer surface of gutter seal 326 to aid in lubricant retention.

In some embodiments, a first side 436 of seal 330 may include a groove 438. Groove 438 may include a surface 440 which may be substantially parallel to axis 410. In some embodiments, groove 438 may be disposed between a lip 442 and a wall 444 of seal 330. Lip 442 may have a substantially rectangular shape and may extend radially perpendicular from axis 410 and/or surface 440. Wall 444 may be a substantially planar surface which may also be disposed substantially perpendicular to axis 410. For example, wall 444 may extend radially outward from axis 410 and/or surface 440 and may be substantially parallel to a surface of lip 442. In some embodiments, groove 438 may be configured to receive clamp 338 (FIG. 3).

As shown in FIG. 4, in some embodiments, seal 330 may contain an insert 446 disposed substantially within body 400 of seal 330. Insert 446 may be disposed between first cutout 406 and second cutout 412. In some embodiments, insert 446 may comprise a relatively rigid, unyielding material, such as a plastic, polymer, wood, metal, or metal alloy, and/or other like material. In exemplary embodiments, insert 446 may comprise a bronze alloy or aluminum alloy.

Insert 446 may be any cross-sectional shape, size, geometry, and/or configuration useful in increasing the overall rigidity and/or integrity of seal 330 and, in some embodiments, insert 446 may have a substantially H-shaped radial cross-section. For example, insert 446 may have an outer surface 448, and an inner surface 450 opposite outer surface 448. Outer and inner surfaces 448, 450 may be disposed substantially parallel to axis 410. In some embodiments, outer surface 448 may have a width substantially equal to width K of first cutout 406. In further embodiments, the width of outer surface 448 may be less than, or greater than, width K. In some embodiments, a width of second surface of insert 446 may be substantially equal to width B of cutout 412. In further embodiments, the width of inner surface 450 may be greater than or less than width B of cutout 412.

Insert 446 may also have a first wall 452, and a second wall 454 opposite first wall 452. First and second walls 452, 454 may be substantially planar, and in exemplary embodiments, first and second walls 452, 454 may be substantially parallel to each other. Additionally, at least one of first and second walls 452, 454 may be disposed substantially perpendicular to axis 410 of seal 330. In still further embodiments, first and second walls 452, 454 may be substantially rounded, non-planar, and/or otherwise irregularly shaped.

Outer surface 448 of insert 446 may include a first tab 456, and a second tab 458 opposite first tab 456. First tab 456 may be proximate first wall 452, and second tab 458 may be proximate second wall 454. First and second tabs 456, 458 may extend radially outward from axis 410 towards outer surface 402 of seal 330. In some embodiments, first and second tabs 456, 458 may be disposed substantially perpendicular to axis 410 of seal 330. In some embodiments, first tab 456 may have a wall 460 disposed substantially perpendicular to axis 410 of seal 330. In further embodiments, wall 460 may extend radially outward toward outer surface 402 of seal 330 at any other angle relative to axis 410 of seal 330. For example, wall 460 may extend radially outward at an acute or obtuse angle from axis 410. In some embodiments, second tab 458 may have a wall 462 disposed substantially perpendicular to axis 410. In some embodiments, wall 462 may be disposed orthogonal to wall 460 of first tab 456. In further embodiments, wall 462 may extend radially outward and form an angle relative to axis 410. In some embodiments, the angles between wall 460 and outer surface 448, and wall 462 and outer surface 448, may be substantially equal.

In some embodiments, inner surface 450 of insert 446 may include a third tab 464, and a fourth tab 466 opposite third tab 464. In some embodiments, third and fourth tabs 464, 466 may extend radially outward from axis 410 towards inner surface 404 of seal 330. In further embodiments, third and/or fourth tabs 464, 466 may be substantially perpendicular to axis 410 of seal 330. In additional embodiments, third and fourth tabs 464, 466 may each contain a wall 468, 470, respectively, that is substantially perpendicular to axis 410. In some embodiments, walls 468, 470 may extend radially inward at an angle relative axis 410. In further embodiments, wall 470 may be disposed substantially orthogonal to wall 468. In some embodiments, the angles formed by walls 468, 470 may be substantially equal.

In further embodiments, insert 446 may be asymmetrical. For example, in such embodiments, outer surface 448 of insert 446 and inner surface 450 of insert 446 may not have equal widths. Further, tabs 456, 458 of outer surface 448 and tabs 464, 466 of inner surface 450 may not have similar geometry. For example, a width of at least one of tabs 456, 458, 464, 466 may not be equal to a corresponding width of remaining tabs 456, 458, 464, 466. Additionally, in such embodiments, at least one of walls 460, 462, 468, 470 may be disposed at dissimilar angles relative to axis 410. In still further embodiments, insert 446 may not be H-shaped. For example, a cross-section of insert 446 may be substantially annular, substantially square, substantially S-shaped, substantially Y-shaped, and/or any other known cross-sectional geometry.

In exemplary embodiments, the location of insert 446 in body 400 of seal 330 may vary. In some embodiments, insert 446 may be located in a bottom half of body 400. For example, insert 446 may be located radially closer to inner surface 404 of seal 330 than to outer surface 402. In further embodiments, insert 446 may be located radially closer to outer surface 402 of seal 330 than to inner surface 404. In exemplary embodiments, insert 446 may be disposed radially between cutouts 406, 412. In some embodiments, insert 446 may be located substantially axially equidistant between wall 444 and wall 420 of body 400. In further embodiments, an axial distance between first wall 452 of insert 446 and wall 444 of body 400 may be smaller than an axial distance between second wall 454 of insert 446 and wall 420 of body 400. In still further embodiments, an axial distance between first wall 452 of insert 446 and wall 444 of body 400 may be greater than an axial distance between second wall 454 of insert 446 and wall 420 of body 400.

FIG. 5 shows a circumferential view, or z-axis view, of a portion of the exemplary seal 330 with an insert 446 disposed therein. Insert 446 may be substantially polygonal, substantially curved and/or substantially S-shaped in such a circumferential direction. In exemplary embodiments, insert 446 may be substantially arcuate in the circumferential direction. For example, insert 446 may have an arc length 500, and may be disposed substantially concentric with an arc 502 of body 400 of seal 330. In alternate embodiments, however, arc length 500 and arc 502 may not be concentric. In additional embodiments, arc length 500 may be between approximately forty and approximately sixty degrees. In exemplary embodiments, arc length 500 may be approximately fifty-five degrees. In still further embodiments, arc length 500 may be greater than approximately sixty degrees or less than approximately forty degrees. In some embodiments, multiple inserts may disposed within body 400 of seal 330. For example, multiple inserts 446 with an arc length of less than approximately forty degrees may span across an arc of body 400. For example, approximately eight inserts with an arc length of approximately five degrees may be spaced approximately two degrees apart across arc length 500. In other embodiments, body 400 of seal 330 may contain two inserts 446 which may be approximately 180 degrees apart in body 400 of seal 330. In further embodiments, body 400 of seal 330 may contain various other configurations altering the number of inserts, the arc length of inserts and/or the spacing between inserts.

In some embodiments, insert 446 may include a feature configured to assist in coupling insert 446 to at least a portion of body 400. For example, in some embodiments, insert 446 may include one or more passages 504. For example, first wall 452 (FIG. 4) of insert 446 may include a first opening of passage 504, and second wall 454 (FIG. 4) of insert 446 may include a second opening of passage 504 opposite the first opening. Passage 504 may be configured to accept part of body 400. For example, during the formation of seal 330, material used to form body 400 may pass through first opening of passage 504 and may exit a second opening of passage 504 such that passage 504 is substantially filled with material of body 400. In exemplary embodiments, passage 504 may be cylindrically-shaped. In further embodiments, passage 504 may be square-shaped, octagonal, pentagonal, oblong, and/or any other known shape. Further, passage 504 may have a symmetric shape, such as a circle, or may be asymmetric. For example, passage 504 may be Y-shaped, T-shaped, L-shaped, and/or other known shape. In some embodiments, insert 446 may contain a single passage 504 or, in further embodiments, insert 446 may contain multiple passages 504. Passages 504 may be the same radial distance from a center of body 400 or may be scattered randomly throughout insert 446. In some embodiments, passages 504 may be substantially perpendicular to first wall 452 of insert 446.

In exemplary embodiments, insert 446 may be located approximately 180 degrees from bolt 308 (FIG. 3) and/or flange 306 (FIG. 3). In further embodiments, insert 446 may be located at various other locations around opening 318 (FIG. 3) of gear case 202 (FIG. 3). For example, insert 446 may be disposed proximate flange 306 and bolt 308. In still further embodiments, seal 332 (FIG. 3) may contain a second insert (not shown). The second insert may be located approximately 180 degrees from bolt 308 and flange 306 or, in some embodiments, the second insert may be located proximate bolt 308 and flange 306. In still further embodiments, the second insert may be disposed at various locations around second opening 300 (FIG. 3) in gear case 202.

INDUSTRIAL APPLICABILITY

Seal 330 containing insert 446 may be used in any application requiring lubricant retention. In exemplary embodiments, insert 446 may assist in substantially preventing seal 330 from compressing during operation. For example, insert 446 may be configured to absorb external compressive forces acting on seal 330. In still further embodiments, seal 330 containing insert 446 may be used to reduce a freedom of motion between relative components. Seal 330 may prolong the life of surrounding components, resulting in reduced maintenance costs and reduced field events, such as component failure. For example, use of seal 330 on gear case 202 for traction motor 114 may result in a prolonged life of the rigidly mounted components.

Referring in part to FIG. 3 and FIG. 4, in some embodiments seal 330 may assist in retaining the lubricant within gear case 202. For example, in some embodiments, seal 330 may retain the lubricant between outer surface 402 of seal and opening 318 of gear case 202. The sealant disposed between seal 330 and gear case 202 may adhere seal 330 to gear case 202 such that the lubricant cannot pass between the two components. Additionally, in some embodiments, inner surface 404 of seal 330 may engage cap 316 forming a substantially fluid-tight seal between the two components. For example, seal 330 may be compressed against cap 316 such that inner surface 404 of seal 330 may deform and may press tightly against cap 316 such that the lubricant may not pass between seal 330 and cap 316. In still further embodiments, knife-edge feature 426 of seal 330 may assist in retaining the lubricant. For example, inner surface 432 of knife-edge feature 426 may compress against gutter seal 326. As inner surface 432 of knife-edge feature 426 is compressed against gutter seal 326, the inner surface 432 may deform and may press tightly against gutter seal 326 such that the lubricant may not pass between knife-edge feature 426 and gutter seal 326.

In additional embodiments, seal 330 may prevent the relative motion of components, such as gear case 202 and cap 316. For example, under various engine operating conditions in which external vibratory forces are transmitted to the various rigidly mounted components of gear case 202 and cap 316, such forces may cause relative movement between gear case 202 and cap 316. Consequently, seal 330 may be compressed by gear case 202 and cap 316, for example, gear case 202 and cap 316 may squeeze material of body 400. In exemplary embodiments, insert 446 may be substantially disposed between gear case 202 and cap 316 across distance P and may assist seal 330 in restricting movement between the two components. For example, insert 446 may not compress when gear case 202 and cap 316 move substantially towards each other. As a result, insert 446 may assist in maintaining a substantially constant distance P between gear case 202 and cap 316.

It will be apparent to those skilled in the art that various modifications and variations can be made to the disclosed seal without departing from the scope of the disclosure. Other embodiments of the seal will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:
1. A seal for a gear case, comprising:
   a body, wherein the body includes a first cutout located on an outer surface of the body, the first cutout extending circumferentially around the body between a first pair of chamfers extending in a radial direction substantially perpendicular to a center axis of the body, the first cutout configured to accept an opening in the gear case; and
   at least one insert substantially enclosed within the body, wherein the at least one insert includes a first wall, and a second wall opposite the first wall, a passage extending through the at least one insert from the first wall to the second wall, and wherein a part of the body passes through the passage from the first wall to the second wall.

2. The seal of claim 1, wherein the body is substantially annular and comprises a substantially flexible material.

3. The seal of claim 1, wherein the at least one insert is substantially arcuate and comprises a substantially rigid material.

4. The seal of claim 3, wherein the at least one insert has an arc length between approximately 40 degrees and approximately 60 degrees.

5. The seal of claim 1, further including a plurality of inserts, each respective insert of the plurality of inserts being spaced from an adjacent insert by a second part of the body.

6. The seal of claim 1, wherein the at least one insert has a substantially H-shaped cross-section.

7. The seal of claim 1, wherein the at least one insert is fabricated from a plastic, polymer, wood, metal, or metal alloy, and the body is fabricated from a plastic or a polymer.

8. The seal of claim 1, wherein the at least one insert is located closer to an inner surface of the body than an outer surface of the body.

9. The seal of claim 1, wherein the body is substantially annular and the at least one insert is substantially arcuate, and the at least one insert is disposed substantially concentric with the body.

10. The seal of claim 1, wherein the body further includes a second cutout located on an inner surface of the body, the second cutout extending circumferentially around the body, the second cutout configured to accept a feature on a mating component.

11. The seal of claim 10, wherein the second cutout is disposed opposite the first cutout, and the at least one insert is disposed radially between the first cutout and the second cutout.

12. The seal of claim 1, wherein the body further includes a groove on a first side of the body, wherein the groove contains a surface substantially parallel to a center axis of the body and the surface is disposed between a lip of the body and a wall of the body, wherein the lip and the wall extend substantially perpendicular to a center axis of the body.

* * * * *